United States Patent
Feng et al.

(10) Patent No.: US 9,578,722 B2
(45) Date of Patent: Feb. 21, 2017

(54) METHODS FOR SELECTING AND CONTROLLING DEVICES

(75) Inventors: Lei Feng, Shanghai (CN); Daiqin Yang, Singapore (CN); Zhigang Chen, Xi'an (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 376 days.

(21) Appl. No.: 13/131,143

(22) PCT Filed: Nov. 26, 2009

(86) PCT No.: PCT/IB2009/055345
§ 371 (c)(1),
(2), (4) Date: May 25, 2011

(87) PCT Pub. No.: WO2010/064167
PCT Pub. Date: Jun. 10, 2010

(65) Prior Publication Data
US 2011/0234366 A1 Sep. 29, 2011

(30) Foreign Application Priority Data

Dec. 4, 2008 (CN) .......................... 2008 1 0179571

(51) Int. Cl.
*G05B 23/02* (2006.01)
*H05B 37/02* (2006.01)
(Continued)

(52) U.S. Cl.
CPC .......... *H05B 37/0272* (2013.01); *G08C 17/02* (2013.01); *H04W 48/20* (2013.01); *G08C 2201/71* (2013.01); *G08C 2201/91* (2013.01)

(58) Field of Classification Search
None
See application file for complete search history.

(56) References Cited

U.S. PATENT DOCUMENTS 5,491,741 A * 2/1996 Farwell et al. ............... 370/347
2003/0107888 A1 6/2003 Devlin et al.
(Continued)

FOREIGN PATENT DOCUMENTS

CN 101247689 A 8/2008
EP 0734197 A1 9/1996
(Continued)

*Primary Examiner* — Brian Zimmerman
*Assistant Examiner* — Kevin Lau
(74) *Attorney, Agent, or Firm* — Meenakshy Chakravorty

(57) ABSTRACT

A method of selecting and controlling devices based on wireless communication technology. The wireless controller sends a probe message to one or more devices; each device receives the probe message, obtains information in respect of its relative position with respect to the wireless controller, determines a response time to respond according to a first predefined rule, based on its relative position information: detects response signals from other devices before expiration of the response time; decides whether to send or not to send its response signal according to a second predefined rule and the detecting procedure of response signals from other devices; the wireless controller receives response signals sent by the devices after the comparison of the relative position information of each device with respect to the wireless controller, and selects the target devices from the devices. Embodiments of the present invention reduce the complexity, delay and energy consumption of the selection for wireless devices, and are especially applicable for wireless lighting systems.

8 Claims, 3 Drawing Sheets

(51) Int. Cl.
  *G08C 17/02*  (2006.01)
  *H04W 48/20*  (2009.01)

(56) References Cited

U.S. PATENT DOCUMENTS

| | | | |
|---|---|---|---|
| 2004/0182926 A1* | 9/2004 | Nakabe et al. | 235/435 |
| 2006/0020302 A1* | 1/2006 | Torgerson et al. | 607/60 |
| 2006/0092855 A1* | 5/2006 | Chiu | 370/254 |
| 2009/0180444 A1* | 7/2009 | McManus | H04W 36/30 370/332 |
| 2009/0243796 A1* | 10/2009 | Tieman | B60R 25/24 340/5.72 |
| 2009/0325624 A1* | 12/2009 | Centonza | 455/522 |
| 2010/0232365 A1* | 9/2010 | Lu et al. | 370/329 |

FOREIGN PATENT DOCUMENTS

| | | |
|---|---|---|
| GB | 1251789 A * | 10/1971 |
| JP | 05276117 A * | 10/1993 |
| WO | 2007072314 A1 | 6/2007 |
| WO | 2007095740 A1 | 8/2007 |
| WO | 2007102112 A1 | 9/2007 |
| WO | 2008078245 A2 | 7/2008 |
| WO | WO 2008078245 A2 * | 7/2008 |
| WO | 2008129488 A2 | 10/2008 |

* cited by examiner

METHODS FOR SELECTING AND CONTROLLING DEVICES

FIELD OF THE INVENTION

The present invention relates to the selection and control of devices, particularly to methods for selecting and controlling devices, based on wireless communication technology.

BACKGROUND OF THE INVENTION

In the indoor and outdoor environments where people live and work, various kinds of electronic and electrical devices are deployed, such as multiple luminaires located at different locations. A user selects and controls these devices to satisfy his working and living requirements. Currently, people usually use immobile controllers, such as a control panel mounted on the wall to control these devices. In this case, if a user wants to control a device, he must go to the control panel to manipulate the button or knob corresponding to the device. As the number of devices increases, the control panel would become more complex with lots of buttons or knobs corresponding to the plurality of devices, and the user has to memorize which button controls the corresponding device. Although wireless communication technology has been used to shorten the distance between the user and the control panel, for example a remoter to control each device remotely, the remoter is still complex because of lots of buttons, menus or options for each device. So, the remoter is voluminous and its user interface is not very user-friendly.

In everyday working and living conditions, among a plurality of devices located in the same control area, a user usually just wants to select and control the device that is in a specific position with respect to him, such as at a specific distance from him or in a specific direction with respect to him. For example, when a user leaves the living room and enters the bedroom, he wants to turn on the luminaires in the bedroom, or turn off the luminaires in the living room; or he wants to turn on the luminaires at which his hand-held remoter is pointing, and maintain other luminaires unchanged. In the prior art, the wireless controller sends a probe message to detect all devices in its control area, and each device sends a respective feedback signal to the wireless controller according to protocols such as Carrier Sense Multiple Access/Collision Avoidance (CSMA/CA). After the wireless controller has received feedback signals from all devices, it selects the target device located in the specific relative position by comparing the radio transmission information of the probe message or the feedback signals, such as Received Signal Strength Indicator (RSSI) or time of flight, and sends a control signal to the target device to control it. It is obvious that the existing system needs the feedback from all devices, and selects the target device in dependence upon all the various feedback received, even if the system just wants to select one target device in a specific distance or direction. As the number of devices increases, the amount of feedback signals also increases, thus the wireless controller needs more time to process and a higher processing capability; meanwhile, a large amount of feedback would increase the collision probability of the channel due to the random access method such as CSMA/CA, thus the wireless controller needs more time to collect all feedback signals from all devices. These drawbacks result in a longer delay before selecting and controlling the target device via the wireless controller, and in an unsatisfactory user experience.

SUMMARY OF THE INVENTION

Therefore, it would be advantageous to provide a method for selecting and controlling devices having a shorter selecting and controlling delay, based on wireless communication technology. It would also be advantageous to reduce feedback signals in the process of selecting and controlling to simplify the wireless controller, save energy and reduce electromagnetic radiation in the environment.

To better address one or more of these concerns, according to embodiments in respect of one aspect of the present invention, there is provided a method, for use in a device to assist a wireless controller to select target devices, in which the method comprises the steps of: i. the device receiving a probe message from the wireless controller, and obtaining relative position information with respect to the wireless controller; ii. determining a response time to respond according to a first predefined rule, based on the relative position information; iii. the device detecting response signals from other devices before expiration of the response time; deciding whether to send or not to send its response signal according to a second predefined rule and the detecting procedure of response signals from other devices before the expiration of the response time, wherein the response signal contains the relative position information.

According to embodiments in respect of another aspect of the present invention, there is provided a method for use in a wireless controller to select target devices from one or more devices, wherein the method comprises the following steps: I. sending a probe message to the one or more devices; II. receiving one or more response signals sent by the one or more devices, wherein each of the response signals contains relative position information describing the device's relative position with respect to the wireless controller; III. based on the relative position information of the one or more response signals, selecting the target device from the one or more devices according to a predefined rule.

According to embodiments of the present invention, each device determines a different response time according to the different relative position with respect to the wireless controller, based on a predefined rule, i.e. the more a device's relative position matches that of the target device, the sooner this device will respond, and the sooner the wireless controller will receive its response, which significantly reduces the delay for selecting the target device; meanwhile, other devices do not respond when they find that there are devices matching the target device better than they do through detecting other's response signals, thus, their energy consumption as well as the transmission of the radio signals and the electromagnetic radiation in the area are reduced, and the processing complexity of the response signals in terms of the wireless controller will be simplified.

The above and other features of the present invention will be elucidated in the embodiments described hereinafter.

BRIEF DESCRIPTION OF THE DRAWINGS

The features, objects and advantages of the present invention will be easily understood with the aid of the following detailed, non-limited exemplary embodiments described with reference to the accompanying drawings, wherein same or similar reference signs denote same or similar devices.

DETAILED DESCRIPTION OF EMBODIMENTS

The embodiments will be exemplarily elucidated with reference to FIG. 1 to FIG. 6, wherein the luminaires are used by way of example.

Embodiment 1

Figure 1:
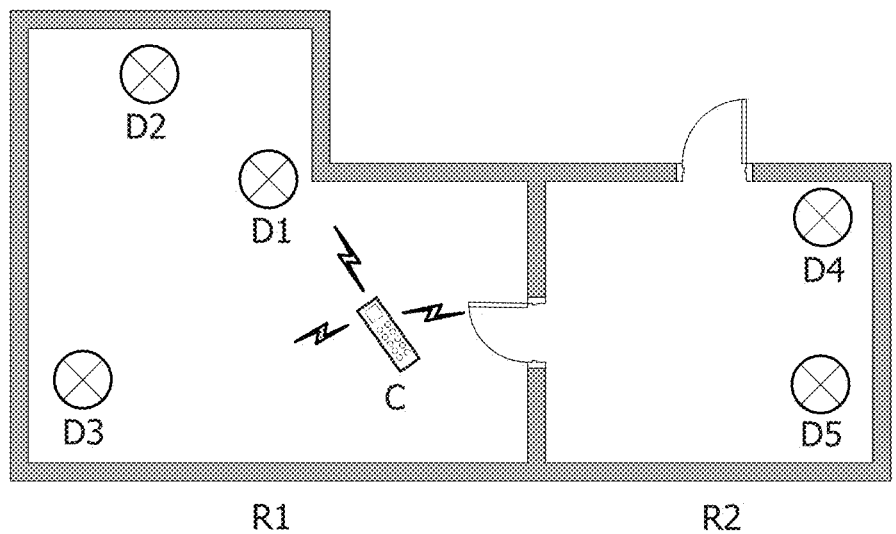
FIG. 1 shows a topology in which a wireless controller selects the nearest luminaire, according to an embodiment of the present invention.

FIG. 1 shows a topology of a lighting area based on a wireless control network. This lighting area is an indoor environment and includes two neighboring rooms R1 and R2. Luminaires D1 through D3 are mounted in room R1, and D4 and D5 in room R2. A wireless controller C sends control signals to each luminaire by means of unicast or multicast, based on the unique identification of each luminaire, to control its lighting functions such as on/off, brightness, color, focus and rotation. The commissioning of the luminaires is completed, which means that the system knows the location of each luminaire. The method of commissioning is well-known to those skilled in the art, and the present invention will not give further details.

Figure 2:
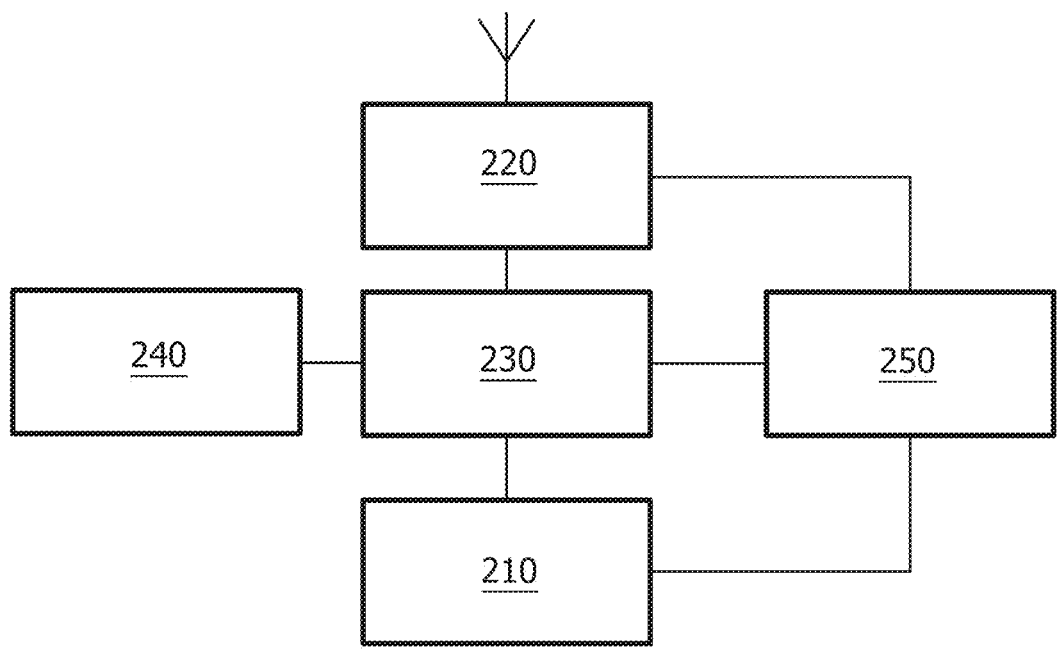
FIG. 2 shows a schematic block diagram of main components in a luminaire, according to an embodiment of the present invention.

As shown in FIG. 2, each luminaire comprises a lighting component 210, a wireless communication module 220 using wireless protocols such as ZigBee™, a processor 230, a memory 240 and a power supply 250. The wireless communication module 220 communicates with the wireless controller C using ZigBee™ or other protocols to establish a wireless network. Each luminaire receives the probe message sent by the wireless controller C, measures the RSSI or time of flight of signals sent by the wireless controller C, and responds with a response signal; the response signal contains the luminaire's unique identification information. The wireless controller selects the desired luminaire, extracts its unique identification from its response signal, and sends a control signal with the unique identification in the form of unicast to the luminaire. The processor 230 and the memory 240 switch the lighting component 210 on/off, adjust its brightness and so on, according to the control signal sent by the wireless controller C. The power supply 250 may connect to a main electrical supply of 120V/60 Hz or 220V/50 Hz and contains a transformer, and provides the electricity for the lighting component 210, the wireless communication module 220, the processor 230 and the memory 240 of the luminaires.

Figure 3:
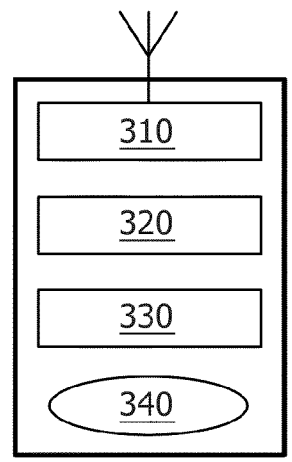
FIG. 3 shows a schematic block diagram of main components in a wireless controller for selecting and controlling devices, according to an embodiment of the present invention.

As shown in FIG. 3, the wireless controller comprises a transceiver 310 coupled with a transceiving antenna, a processor 320, a memory 330 and a user interface 340. The user interface 340 contains controlling interfaces such as a button, a knob or a touch screen, the processor 320 generates a probe message or control signal for luminaires according to the user's mode of operation, and the signal is transmitted by the transceiver 310. The transceiver 310 is also based on the ZigBee™ protocol and communicates with each luminaire. The memory 330 stores received identification information of luminaires. The wireless controller may be a standalone and special product for the lighting system, or may be implemented in a PDA (Personal Digital Assistant) or a mobile phone, and it may also be integrated in other wireless controllers such as a TV remoter.

The embodiment will elucidate the present invention with respect to the selection and control of luminaires based on RF (Radio Frequency) technology such as the ZigBee™ protocol. It should be understood that the present invention is not limited to RF technology, and is also applicable to other wireless technologies such as infrared, ultrasonic and laser. The lighting area is not limited to indoor environments as shown in FIG. 1, and is also applicable to outdoor environments such as gardens, stadiums and building sites. What's more, the present invention is applicable for selecting and controlling any other devices, such as temperature adjusting devices and audio regenerating devices.

In this embodiment, the user holding the wireless controller C enters room R1 from room R2, and the luminaires D1 through D3 in R1 are off while D4 and D5 in R2 are on. At this moment, the user usually wants to turn on the nearest luminaire D1, in order to illuminate this room. The user inputs a command "turn the nearest luminaire on" into the wireless controller C through its user interface.

Figure 4:
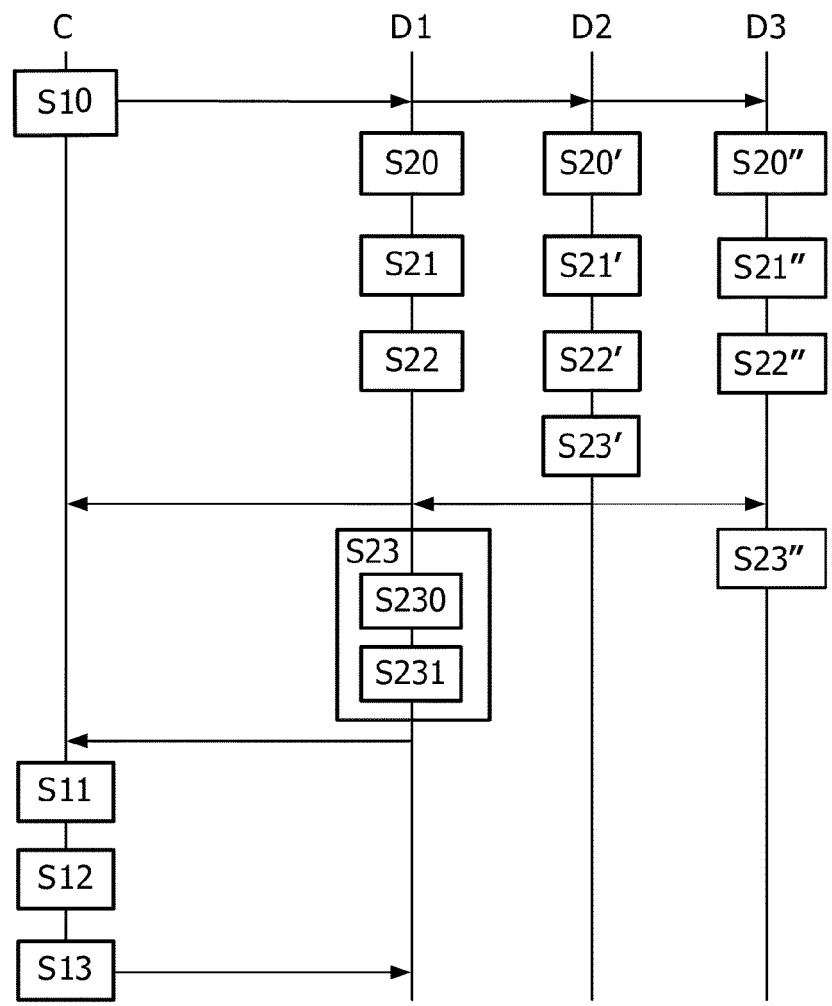
FIG. 4 shows a flowchart of the method, in which a wireless controller selects a target device from multiple devices, according to an embodiment of the present invention.

As shown in FIG. 4, first in step S10, the wireless controller C sends a probe message in one channel (certain communication resource such as time and frequency) to luminaires D1 through D5 within the control area. It sends this probe message usually in the form of broadcast. Each luminaire receives and detects a probe message in the channel, and recognizes that the wireless controller C is selecting the nearest target devices.

And in step S20, the luminaire D1 receives this probe message, and measures the distance information, such as signal strength or time of flight of the probe message, which indicates the distance between D1 and the wireless controller C. Concretely, the ZigBee™-based wireless communication module 220 of the luminaires can receive and recognize the probe message, and measure the RSSI of the probe message. The ZigBee™ protocol and its measuring method for RSSI are well-known to those skilled in the art and are not the focus of the present invention, so further details will not be described.

In the meantime (transmission delay of the radio signals is ignored), in step S20' and S20", the luminaires D2 and D3 also receive this probe message and obtain the distance information between D2 and D3 and the wireless controller C, such as RSSI of the probe message. The luminaires D4 and D5 carry out similar steps as D3, and will not be elucidated in the following description unless necessary.

After that, in step S21, S21' and S21", each of the luminaires D1, D2 and D3 respectively determines its response time $T_{D1}$, $T_{D2}$ and $T_{D3}$ to respond to the wireless controller C according to a first predefined rule, based on its distance information, i.e. RSSI of the probe message in this embodiment. In this embodiment, since the wireless controller C wants to select the nearest luminaire, the first predefined rule is:

The shorter the distance indicated by the distance information is, the smaller the response time is.

Under this rule, compared with the traditional random response of all luminaires based on CSMA/CA in the art, the wireless controller receives the response signal of the nearer luminaires as quickly as possible, thus the delay for selecting the nearest luminaire is shorter, and the collision probability is decreased. Concretely, the propagation attenuation of the radio signal is relevant to the distance between the transmitter and the receiver, such as formulated by the following Friis equation:

$$\frac{P_r}{P_t} = G_t G_r \left(\frac{\lambda}{4\pi R}\right)^2 \quad (1)$$

wherein $P_r$ and $P_t$ are receiving power and transmitting power, respectively, $G_t$ and $G_r$ are antenna gain of the transmitter and the receiver, respectively, $\lambda$ is the wavelength of the radio signal and R is the distance between the transmitter and the receiver. It is obvious that each luminaire can use the RSSI of the probe message ($P_r/P_t$) as the distance information indicating the distance between itself and the wireless controller C, when the wireless controller C uses an omni-directional transmitting antenna, which means the probe message was sent with the same transmitting power to each luminaire in all directions (360 degrees), the antenna gains of all the luminaires are the same and interferences caused by noise etc. are the same. Therefore, the first predefined rule is:

The bigger the RSSI of the probe message is, the smaller the determined response time is.

Figure 5:
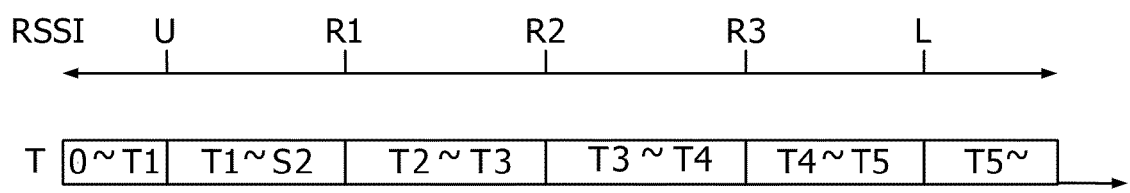
FIG. 5 is a schematic view of the first predefined rule used by each luminaire to determine its response time based on RSSI, according to an embodiment of the present invention

This embodiment of the present invention proposes a Prioritized Slotted mechanism, and each luminaire uses this mechanism to determine its response time according to its RSSI of the probe message. As shown in FIG. 5, the RSSI is graded into 6 different segments according to several thresholds and each segment corresponds to one response time segment, wherein the RSSI bigger than the upper bound U corresponds to the time segment 0~T1, RSSI smaller than the upper bound U and bigger than the threshold R1 corresponds to the time segment T1~T2, and so on; RSSI smaller than the lower bound L corresponds to the time segment after T5, wherein T5>T4>T3>T2>T1>0. Each luminaire first selects a corresponding RSSI segment according to its RSSI of the probe message, and then it selects a corresponding response time segment according to its selected RSSI segment, and finally it determines a response time in its selected response time segment. In a preferred embodiment, determining the response time in the response time segment is random, in order to avoid response collision between several luminaires in the same RSSI segment and the same response time segment. These luminaires in the same response time segment further use medium access protocols such as CSMA/CA or ALOHA to back off when collision occurs.

In this embodiment, the luminaire D1 is nearest to the wireless controller C, and D3 is most remote, therefore the $RSSI_1$ of the probe message in D1 is the biggest, the $RSSI_2$ in D2 is the medium one and the $RSSI_3$ in D3 is the smallest. In this embodiment, $RSSI_1$ and $RSSI_2$ are between the upper bound U and threshold R1, and $RSSI_3$ is between the thresholds R1 and R2. Therefore, in step S21, S21' and S21", the luminaires D1, D2 and D3 respectively determine their response time $T_{D1}$, $T_{D2}$ and $T_{D3}$ in T1~T2, T1~T2 and T2~T3. In a preferred embodiment, these response times are determined randomly in the time segments.

After that, in step S22, the luminaire D1 detects response signals from other devices in the response channel before the expiration of $T_{D1}$. And so do the luminaire D2 before the expiration of $T_{D2}$ in step S22' and the luminaire D3 before the expiration of $T_{D3}$ in step S22". If the RSSI of a luminaire is higher than the upper bound, its response time is 0 and it would not detect response signals from other devices and would send a response signal immediately. It should be understood that all luminaires in the lighting area should be synchronized. The synchronization could be achieved by the probe message sent by the wireless controller C: due to that, the lighting area is relatively small and the transmission time of the probe message sent from the wireless controller C to each luminaire is approximately the same, and hence each luminaire can be synchronized by its received probe message. The synchronization could also be achieved by using other existing methods, however, the present invention will not give further details.

Subsequently, in step S23, S23' and S23", the luminaires D1, D2 and D3 respectively decide whether or not to send their response signal according to a second predefined rule and the detecting procedure of response signals from other luminaires before the expiration of the respective response time. The second predefined rule comprises the following sub-rules:

a) sending the response signal, if no response signal from other luminaires is detected before expiration of the response time; and b) sending the response signal, if at least one response signal from other luminaires is detected before expiration of the response time, and the other luminaires' distance to the wireless controller C is bigger than the distance of any of the luminaires D1, D2 and D3 to the wireless controller C.

In one case, $T_{D2}$, randomly determined in the response time segment T1~T2 by the luminaire D2, is smaller than $T_{D1}$, randomly determined in the same time segment by D1, wherein both $T_{D2}$ and $T_{D1}$ are smaller than $T_{D3}$. In this case, the second predefined rule used by D2 is the one stated above under a): since the luminaire D2 has not detected any response signal from other devices before $T_{D2}$ expires, it sends its response signal to the wireless controller C in step S23', wherein the response signal contains its RSSI of the probe message. This response signal would also be received by the luminaire D1 in step S23 and D3 in step S23", which detect response signals before the expiration of respectively $T_{D1}$ and $T_{D3}$.

The step S23 carried out by the luminaire D1 can be divided into steps S230 and S231. Concretely, in step S230, the luminaire D1 receives the response signal of D2, and extracts D2's RSSI of the probe message. In step S231, D1 compares it with its own RSSI of the probe message, based on the above, second predefined rule b: D1 also sends its response signal to the wireless controller C, since the luminaire D1 knew that the wireless controller C selects the nearest luminaire (for example it is instructed in the probe message), and D2's RSSI of the probe message is smaller than D1's RSSI of the probe message, which means the luminaire D1 is nearer to the wireless controller C than D2.

Meanwhile, in step S23", the luminaire D3 also receives the response signal of D2 and extracts D2's RSSI of the probe message from it, and compares the RSSI with its own RSSI of the probe message, based on the above, second predefined rule b). The luminaire D3 abandons its response, since the luminaire D3 knows that the wireless controller C selects the nearest luminaire, and D2's RSSI of the probe message is bigger than D3's RSSI of the probe message, which means the luminaire D2 is nearer to the wireless controller C than D3. Alternatively, the luminaire D3 knows the response time segment of D2 is higher than its response time segment, which means its RSSI of the probe message is definitely in a lower segment than D2's, so it doesn't need to extract D2's RSSI of the probe message from it and compare the RSSI with its own RSSI, and can abandon its response directly. Through abandoning the responses of further luminaires, the collision probability of responses of other nearer luminaires is alleviated, and the energy consumption of the luminaires abandoning their responses as well as the electromagnetic radiation in the lighting area is decreased.

In another case (not shown in FIG. 4), $T_{D1}$, randomly determined in the response segment T1~T2 by the luminaire D1, is smaller than $T_{D2}$, randomly determined by the luminaire D2. Therefore, the luminaire D1 would first send its response signal including its RSSI of the probe message to the wireless controller C, and this response signal is also received by the luminaires D2 and D3. The luminaires D2 and D3 obtain D1's RSSI of the probe message, determine that D1 is nearer to the wireless controller than they are, and thus abandon their responses. The collision probability, the energy consumption and the electromagnetic radiation are decreased.

After that, in step S11, the wireless controller C receives one or more response signals sent by the luminaire D1 or by the luminaires D1 and D2, wherein the luminaire D1 or the luminaires D1 and D2 send their response signals by comparing the distance between the wireless controller C and each of D1, D2 and D3. The comparison is achieved in an indirect manner, in which the system determines a different response time for each luminaire according to their different RSSI of the probe message, and abandons the response of relatively farther luminaires. In a practical system, the wireless controller C can set a receiving deadline after it has broadcast the probe message, and receives responses only before the expiration of the deadline.

It should be understood that if $T_{D1}$ and $T_{D2}$ are the same or nearly the same, the luminaires D1 and D2 may send response signals at the same time. In this case, the two luminaires could back off and re-send their response signals, based on current medium access protocols such as CSMA/CA or ALOHA. And during said back-off, the luminaires continue detecting whether or not other luminaires send response signals, and will carry out the manipulations mentioned hereinabove, such as obtaining and responding or abandoning response when a response signal has been detected.

Then in step S12, based on the relative position information in one or more response signals, the wireless controller C selects the nearest target luminaire from one or more corresponding luminaires according to a predefined rule.

Concretely, in one case, the wireless controller C receives the response signals sent by the luminaires D2 and D1, and the response signals contain each luminaire's RSSI of the probe message. Then, by comparing the RSSI of each luminaire, the wireless controller C would select the luminaire D1 with the biggest RSSI as the nearest luminaire. In another case, the wireless controller C receives only the response signal sent by the luminaire D1, and would determine D1 to be the nearest luminaire. In this way, the target luminaire D1 which is the nearest to the user has been selected.

Additionally, in step S13, the wireless controller C would send the generated control signal for controlling the nearest luminaire D1 to D1 according to a transmitting scheme corresponding to D1's RSSI of the probe message, wherein the control signal contains D1's unique identification to help its reorganization. Concretely, if D1's RSSI of the probe message is −5 dB, while the wireless communication module of luminaires needs an RSSI of −7 dB to receive and detect the control signal, the wireless controller C reduces its transmitting power by about 1 dB in order to guarantee that the luminaire D1 obtains the control signal with a RSSI of −6 dB. In this way, the energy consumption of the wireless controller C and the electromagnetic radiation in the lighting area are decreased. Since this control signal is only for D1, whether or not other luminaires can obtain it is not essential.

It should be understood that the present invention is not limited to the Prioritized Slotted mechanism. When the number of luminaires is small and there are few response collisions in one response time segment, another embodiment of the present invention proposes to directly allocate different response times for luminaires with different RSSI of the probe message. For example, the response time is 0 for the RSSI higher than the upper bound U, and the response time is T1 for the RSSI between U and R1, and so forth. In this way, the nearest luminaire would respond first, and other luminaires would abandon their response once they detect the response signal of the nearest luminaire. Thus, the delay for selecting the nearest luminaire by the wireless controller C and the collision probability can be decreased, the energy consumption of each luminaire can be reduced and the electromagnetic radiation in the lighting area can be reduced. The earliest, also the only response signal received by the wireless controller C should be sent from the nearest luminaire.

The above-mentioned embodiment elucidates the present invention by way of an example of turning on a luminaire, and it should be understood that the present invention is also applicable for other above-mentioned controls such as turning off, adjusting brightness, color, focus and rotation and so on.

The present invention is also applicable for selecting the second nearest luminaire. Concretely, the wireless controller C can set a maximum RSSI in the probe message. Each luminaire receives this probe message and first judges whether its RSSI of the probe message satisfies the third predefined rule: whether the RSSI of the probe message is smaller than the maximum RSSI. If so, it continues the above steps S20 to S23 to respond; otherwise, it abandons its response. Thus, the luminaires whose distances to the wireless controller C are the smallest, or smaller than one threshold distance, are filtered. This maximum RSSI is obtained by a previous selection of the nearest luminaire according to the above embodiment, or through experience or experiments in a practical environment. Similarly, the present invention is also applicable for selecting a group of nearest luminaires.

Further, the present invention is also applicable for selecting the farthest luminaire. For example, after entering the room R1, the user wants to turn off the luminaires D4 and D5 in the room R2. In this case, the first predefined rule used by the luminaires to determine its response time is:

The longer the distance indicated by the distance information is, the shorter the response time is.

When RSSI is used for describing the distance, this rule is:

The smaller the RSSI of the probe message is, the shorter the response time is.

Meanwhile, the second predefined rule, used to judge whether to respond or abandon a response, comprises:

a) sending the response signal, if no response signal from other luminaires is detected before expiration of the response time; and c) sending the response signal, if at least one response signal from other luminaires is detected before expiration of the response time, and the other luminaires' distance to the wireless controller is smaller than this luminaire's distance to the wireless controller.

The Prioritized Slotted mechanism is also applicable in this embodiment. And this embodiment can be used for controlling further luminaires through setting a minimum RSSI in the probe message. In this case, the probe message contains the minimum RSSI, and each luminaire judges whether its RSSI of the probe message satisfies the third predefined rule: whether the RSSI of the probe message is bigger than the minimum RSSI. If so, it carries out similar steps as the above steps S20 through S23 to respond; otherwise, it abandons its response. Similarly, this embodiment is also applicable for selecting a group of farthest luminaires.

In a similar way, by setting one maximum RSSI and one minimum RSSI simultaneously, embodiments of the present invention can be used to select one or more luminaires located within a range or outside that range. Those skilled in the art would obtain embodiments thereof in scenarios based on the disclosure and teachings of the present description without inventive work, and the present description will not give further details.

After selecting one or more luminaires around the wireless controller C, the wireless controller C provides a list of luminaires for the user from which he can select manually.

The commands of the above, different selection and control steps for luminaires at different distances can be easily input into the wireless controller C by the user. For example, there are "distance" and "function" options in the user interface of the wireless controller C. The user can set "distance" as "nearest" and "function" as "on"; or set "distance" as "farthest" and "function" as "off" to input his commands into the wireless controller C, which would thereafter generate a corresponding probe message and start the selection and control steps.

The above embodiments use RSSI of the probe message as the distance information to indicate the distance between the luminaires and the wireless controller C. Alternatively, the time of flight of the probe message, or of both RSSI and time of flight of the probe message, can be employed to indicate the distance. Those skilled in the art can reasonably foresee that other radio signal transmitting features can also be used; these usages are within the protective scope of the appended claims, and the present description will not give further details.

The above embodiments elucidate an application of the present invention, in which the wireless controller employs an omni-directional antenna to select the nearest or the nearer luminaires, the farthest or farther luminaires, or luminaires within or outside of a range. Another application of the present invention will be elucidated hereinafter, in which the wireless controller C employs a directional antenna to select the luminaires with a specified azimuth to the wireless controller C.

Embodiment 2

Figure 6:
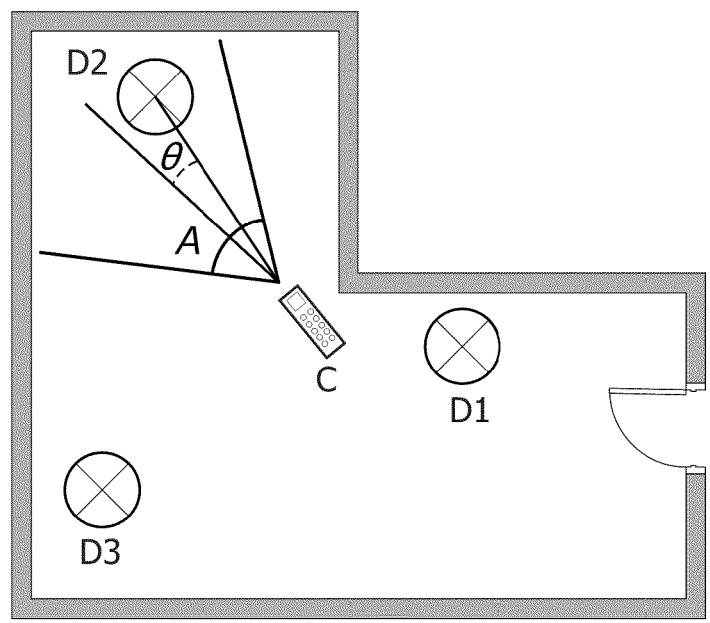
FIG. 6 shows a topology in which a wireless controller selects the luminaire at which the wireless controller is pointing, according to another embodiment of the present invention.

As shown in FIG. 6, the transmitting antenna of the wireless controller C is directional, such as a directional antenna with beam-forming capacity. This kind of antenna has a relatively stronger transmitting power within the scope of angle A, such as the direction the wireless controller C is pointing to, and has a weaker transmitting power in another angle scope. Therefore, when the user wants to select the luminaire D2 and control it, he can direct his hand-held wireless controller C towards D2. In this way, the azimuth θ between the luminaire D2 and the transmitting angle of the wireless controller C (which is the angle between the direction of peak transmission and the direction to D2) is relatively small; while the azimuths of the luminaires D3 and D1 are relatively large.

Firstly, the wireless controller C broadcasts a probe message, and the transmitting power within the angle A is strong, while it is weak outside the angle A.

Subsequently, the luminaires having received the probe message carry out similar steps as described hereinabove: they determine the relative position information with respect to the wireless controller. In this embodiment, the relative position information is azimuth information, and specifically the directional gain of RSSI of the probe message. Due to the transmission property of the directional antenna of the wireless controller C, the directional gain of RSSI of the probe message in the luminaire D2 is strong, while it is weak in the luminaires D3 and D1. The wireless communication module 220 of the luminaires has the capacity of measuring the directional gain of RSSI of the probe message, and its implementation is well-known to those skilled in the art, therefore the present invention will not give further details.

Then, each one of the luminaires D2, D3 and D1 respectively determines its response time $T_{D1}$ $T_{D2}$ and $T_{D3}$ to respond according to a first predefined rule, based on its azimuth information. Since the wireless controller C selects the luminaire it points to, the first predefined rule is:

The smaller the azimuth indicated by the azimuth information is, the shorter the response time is.

In the case that the directional gain of RSSI of the probe message indicates the azimuth information, the rule is:

The stronger the directional gain of RSSI of the probe message is, the shorter the response time is.

In this way, luminaires within the pointed angle scope A would respond as quickly as possible. The delay for selecting the target luminaire and the probability of response collision would be reduced, and the user experience would be improved.

Preferably, the Prioritized Slotted mechanism described hereinabove could be employed by the luminaires to avoid collision.

Since the directional gain of RSSI of the probe message in the luminaire D2 is the strongest, its determined response time $T_{D2}$ is shorter than $T_{D3}$ and $T_{D1}$ of the luminaires D3 and D1. Each luminaire detects response signals from other luminaires. The luminaire D2 hasn't detected response signals from other luminaires before the expiration of $T_{D2}$, therefore it sends its response signal, which would be received by the wireless controller C and also detected by the luminaires D3 and D1.

Then, the luminaires D3 and D1 judge that D2's directional gain of RSSI of the probe message is stronger than theirs, which means that D2 has a smaller azimuth to the transmitting angle of the wireless controller C and thus D2 more likely is located within the scope of angle A, therefore they abandon their responses. In this way, the collision probability, the energy consumption and the electromagnetic radiation are reduced.

Meanwhile, the wireless controller C determines that the luminaire D2 is the target luminaire according to D2's response signal. Further, it sends a control signal to luminaire D2 according to a transmitting scheme corresponding to D2's directional gain of RSSI of the probe message.

It should be understood that the above embodiment is not limited to the Prioritized Slotted mechanism. When the number of luminaires is small and there are few response collisions in one response time segment, another embodiment of the present invention proposes to allocate different response times to luminaires with different directional gains of RSSI of the probe message.

Similarly, the present invention is applicable for selecting the luminaires from the scope of the pointed angle. In this case, the first predefined rule used by luminaires for determining the response time is:

The bigger the azimuth indicated by the azimuth information is, the smaller the response time is.

The above embodiments elucidated the applications of the present invention in selecting respectively the nearest or nearer luminaires, the farthest or farther luminaires, and luminaires within or outside the pointed angle. It should be understood that these selection functions could be integrated in one system, in which the wireless controller sends different probe messages corresponding to different selections, e.g. omni-directionally or directionally. And each luminaire has stored different first, second and third predefined rules with respect to each selection in its program: when the probe message indicates the selection of the nearest luminaire, the loaded first predefined rule to determine its response time is that: the shorter the distance or the bigger the RSSI is, the smaller the response time is; and the loaded second predefined rule is that: the luminaire will abandon its response if the detected RSSI of other luminaires is bigger than its RSSI; when the probe message indicates the selection of the farthest luminaire, the loaded first predefined rule is that: the longer the distance or the smaller the RSSI is, the shorter the response time is, and the loaded second predefined rule is that: the luminaire will abandon its response if the detected RSSI of other luminaires is smaller than its RSSI; when the probe message indicates the selection of the luminaire within the scope of the pointed angle, the loaded first predefined rule is that: the smaller the azimuth or the bigger the directional gain of RSSI is, the smaller the response time is; and the loaded second predefined rule is that: the luminaire will abandon its response if the detected directional gain of RSSI of other luminaires is bigger than its directional gain of RSSI. It is convenient to integrate these selection functions in the form of software and programming. For each luminaire, the predefined rules are pre-stored in its memory 240, and loaded by the processor 230. It is also feasible for the wireless controller to broadcast the predefined rules to each luminaire before the selection, or during the selection.

In the above embodiments, the luminaires measure the radio transmission information of the probe message, such as RSSI, time of flight or directional gain of RSSI, and use it as relative position information with respect to the wireless controller. It should be understood that the method of determining the relative position of a luminaire is not limited to the measurement of the radio transmission of the probe message. In other embodiments in which the commissioning of each luminaire has been finished, a luminaire determines its relative position information, such as distance or azimuth, with respect to the wireless controller, based on the calculation of its coordinates and the wireless controller's coordinates provided by the wireless controller in the probe message, then determines a response time according to its relative position, and responds according to the response time order or abandons its response if necessary.

In the above embodiment, the wireless controller and the luminaires are stationary. The present invention is also applicable in cases where either the wireless controller or the luminaires, or both, are mobile. The wireless controller continually selects and controls the nearest or farthest luminaire. This kind of dynamic selection is also within the protective scope of the claims of the present invention.

In the embodiments of the present invention, the method, in which luminaires respond at different response times determined by different relative positions (such as different RSSI of the probe messages) for reducing response collision and selection delay, and the method, in which a luminaire abandons responses (for example if the detected RSSI of the probe message of other devices is bigger than that of this device) for reducing the risk of a response collision, the energy consumption and the electromagnetic radiation, are employed. It should be understood that the two methods can be employed separately, and in conjunction to achieve better technical effects than the prior art.

Based on the above embodiments, it is obvious that the applications of the present invention include but are not limited to the following:

Selecting and controlling the nearest or the farthest luminaire;

Selecting and controlling the luminaire with the smallest or biggest azimuth between the luminaire and the transmission angle of the directional wireless controller;

Selecting and controlling all luminaires within a certain scope with a relative position.

Meanwhile, the present invention is applicable for selecting and controlling any other home, office or manufacturing devices, such as temperature adjusters and audio regenerators; it is also useful for the route selection in wireless ad-hoc networks. Those skilled in the art can reasonably foresee that all equivalent substitutes or obvious variants of the technical features will exhibit the same performance.

The method aspect of the present invention is elucidated in the above embodiments. It should be understood that the present invention can be implemented in the form of apparatus. The wireless controller and each luminaire comprise various devices and sub-devices carrying out each of the above steps. Those skilled in the art will obtain embodiments of apparatus, based on the disclosure and teachings of the present description, without inventive work, and the present description will not give further details herein.

As many different embodiments of the present invention can be made without departing from the spirit and scope thereof, it should be understood that the invention is not limited to the specific embodiments described herein, and the scope of the invention is limited only by the appended claims.

What is claimed is:

1. A method, implemented in a given device and a wireless controller that performs a selection process, comprising the steps of:
   i. receiving, at the given device, a probe message from the wireless controller, and obtaining, based on the probe message, relative position information of the given device with respect to the wireless controller;
   ii. determining, at the given device, a response time to send a given device response signal to the message according to a first predefined rule based on the relative position information of the given device;

iii. receiving, at the wireless controller, a response signal from at least one other device, wherein the response signal from the at least one other device contains the relative position information of the at least one other device;

iv. detecting, at the given device, the response signal from the at least one other device before expiration of the response time; and v. deciding, at the given device, whether to send or not to send the given device response signal by: retrieving the relative position information contained in the at least one received response signal from the at least one other device; comparing the relative position information of the at least one other device to the relative position information of the given device, wherein the given device response signal contains the relative position information of the given device; and sending the given device response signal only if the at least one other device's distance to the wireless controller is greater than the distance of the given device to the wireless controller.

2. The method according to claim 1, wherein the first predefined rule comprises at least one of the following sub-rules:

the relative position information of the given device includes distance information, and the shorter or the longer the distance indicated by the distance information is, the smaller the response time is; and the relative position information of the given device includes azimuth information describing the azimuth between the given device and the wireless controller, and the smaller or the bigger the azimuth indicated by the azimuth information is, the shorter the response time is.

3. The method according to claim 1, wherein step (ii) further comprises the steps of:

a) selecting a corresponding relative position information segment according to the relative position information of the given device;

b) selecting a corresponding response time segment according to the relative position information segment; and c) selecting the response time in the response time segment.

4. The method according to claim 1, wherein the relative position information of the given device comprises at least one of RSSI of the probe message, time of flight of the probe message, and directional gain of RSSI of the probe message.

5. The method according to claim 1, wherein the method further comprises the following step between step (i) and step (ii): deciding whether the given device's relative position information satisfies a third predefined rule, and, if so, carrying out step (i) and step (iv).

6. The method according to claim 5, wherein the third predefined rule is used for judging:

whether the distance between the given device and the wireless controller is shorter than a first threshold and/or longer than a second threshold; or whether the azimuth between the given device and the wireless controller is smaller than a third threshold and/or bigger than a fourth threshold.

7. A method for selecting a target device from among a plurality of devices, wherein the method comprises the steps of:

i. sending, by a wireless controller, a probe message to the plurality of devices, wherein each of the plurality of devices is configured to obtain, based on the probe message, relative position information of the respective device with respect to the wireless controller;

ii. receiving, by the wireless controller, a response signal sent by at least some of the plurality of devices, wherein each of the received response signals contains relative position information describing the corresponding devices' relative position with respect to the wireless controller, wherein a response signal is sent by a respective one of the plurality of devices only if said respective one of the plurality of devices determines that said respective one of the plurality of devices is closer to the wireless device than another of the plurality of devices;

iii. comparing, by the wireless controller, the relative position information contained in the received response signals, and, in direct response to said comparing, selecting the target device from among the plurality of devices according to a predefined rule;

iv. determining, by the wireless controller, from the relative position information contained in the response signal, a power level that both: (a) guarantees reception of a signal from the wireless controller by the selected target device; and (b) minimizes power consumption by the wireless controller; and v. sending, by the wireless controller, a control signal containing a unique identifier for the selected target device at the power that is selected based on the relative position information for the selected target device.

8. The method according to claim 7, wherein the probe message comprises a predefined relative position condition, wherein the predefined relative position condition is used for judging:

whether the distance between the target device and the wireless controller is shorter than a first threshold and/or longer than a second threshold; or whether the azimuth from the transmission angle of the wireless controller is smaller than a third threshold and/or bigger than a fourth threshold.

* * * * *